(No Model.) 2 Sheets—Sheet 1.
J. B. GARLAND.
COMBINED DUMPING TRAY AND EGG TESTER.
No. 481,488. Patented Aug. 23, 1892.
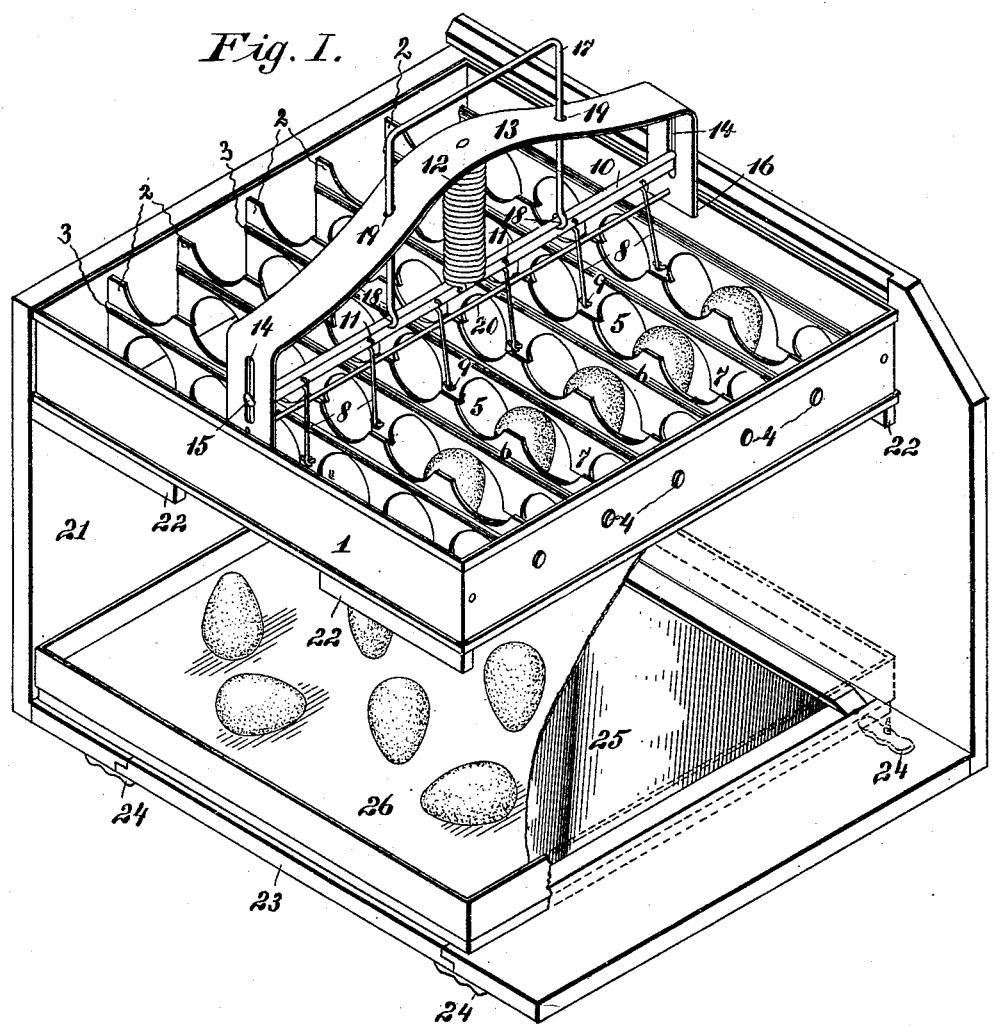
Fig. I.
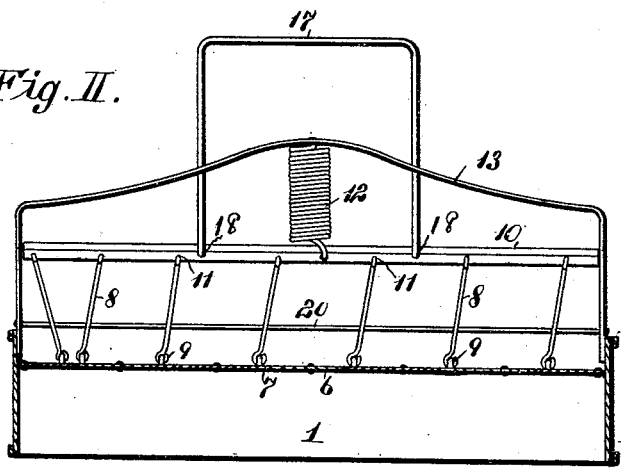
Fig. II.
Witnesses:
F. G. Fischer
Geo. E. Cruse
Inventor:
J. B. Garland
By Knight Bros.
Attys.

(No Model.) 2 Sheets—Sheet 2.
J. B. GARLAND.
COMBINED DUMPING TRAY AND EGG TESTER.
No. 481,488. Patented Aug. 23, 1892.
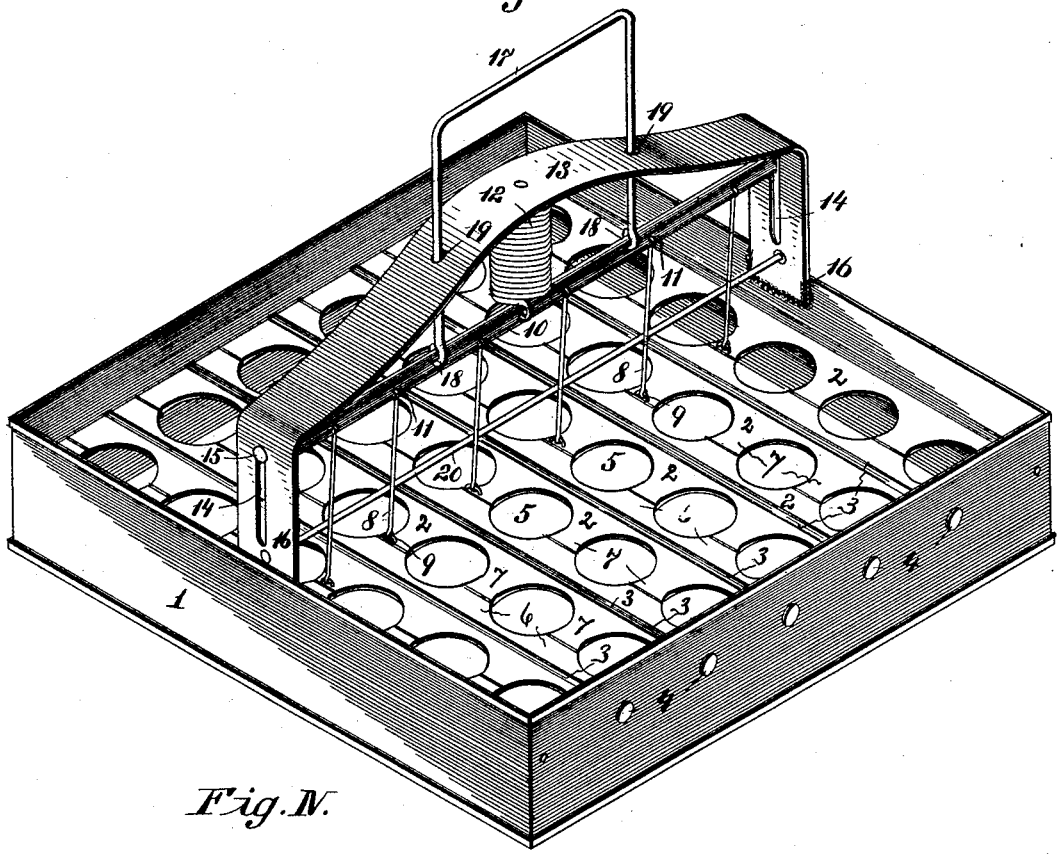
Fig. III.
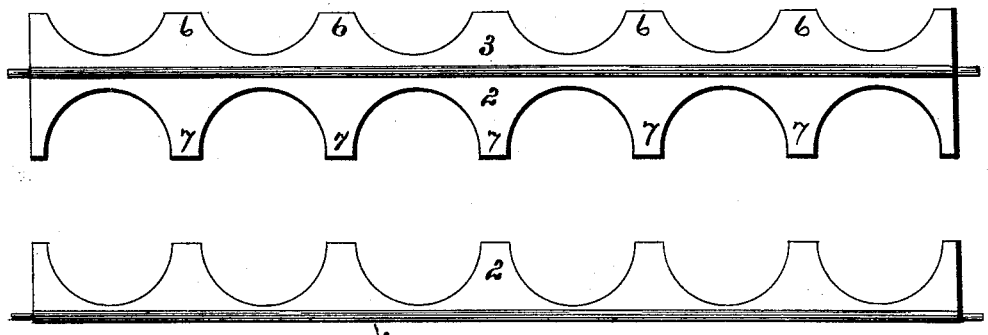
Fig. IV.
Fig. V.
Witnesses:
F. G. Fischer
Geo. E. Cruse
Inventor:
J. B. Garland
By Knight Bros.
Attys.

UNITED STATES PATENT OFFICE.

JEREMIAH B. GARLAND, OF OSAGE CITY, ASSIGNOR OF ONE-HALF TO JOHN N. CRAIG, OF COYVILLE, KANSAS.

COMBINED DUMPING-TRAY AND EGG-TESTER.

SPECIFICATION forming part of Letters Patent No. 481,488, dated August 23, 1892.

Original application filed May 16, 1891, Serial No. 393,060. Divided and this application filed February 9, 1892. Serial No. 420,861. (No model.)

*To all whom it may concern:*

Be it known that I, JEREMIAH B. GARLAND, of Osage City, in the county of Osage and State of Kansas, have invented certain new and useful Improvements in a Combined Dumping-Tray and Egg-Tester, of which the following is a full, clear, and exact description, reference being had to the accompanying drawings, which form a part of this specification.

My present invention set forth in this application is a division of my application, Serial No. 393,060, filed May 16, 1891, and relates to a certain new and useful device for holding eggs while the same are being tested as to their soundness and for discharging them into a crate or other device after the same have been tested; and it consists in certain features of novelty hereinafter described, and pointed out in the claims.

Figure I is a perspective view of my improved device, showing a portion of the tester broken away in order to more clearly show the operation of the dumping-tray. Fig. II is a transverse section showing the slats in proper position for receiving the eggs. Fig. III is a perspective showing the tray in position for receiving the eggs. Fig. IV is a detail plan view of one of the central slats for supporting the eggs. Fig. V is a detail plan view showing the half-slats that are located at either side of the tray.

Referring to the drawings, 1 represents the square-shaped frame, to which is pivoted a series of slats 2, the main portion of the same being preferably formed of tin and having ribs or rods 3 extending lengthwise through the same, said ribs being journaled in the frame 1 and headed or riveted on the outer side of same, as shown at 4, to retain them in their proper position and to prevent the sides of the frame 1 from spreading and thus permitting the slats to fall out, the frame 1 thus being braced throughout.

The slats 2 are provided with openings 5 of the proper size for holding the eggs to be tested, each of said openings 5 being formed by two of the slats adjoining each other by extensions 6 7 of said slats meeting each other. Each of said slats 2 is held in its horizontal position by rods 8, pivoted thereto at 9 and having their opposite ends pivoted to a transverse bar 10, as shown at 11, said bar 10 being connected by a spring 12 with an arch frame 13 and having its ends secured to the sides of said frame 13 by passing through slots 14 therein, said ends of bar 10 being headed, as shown at 15, to prevent withdrawal of the same. The arched frame 13 is secured to the frame 1, as shown at 16, by any suitable means.

17 represents a bail connected with the bar 10, as shown at 18, said bail extending up through the arched frame 13, as shown at 19.

20 represents a rod connecting the frame 13 near its junction with the frame 1, thus forming a chord to the arch frame in order to stiffen the same.

After the eggs have been placed in the openings 5 in order to be tested and it is desired to deposit them in the shipping-crate or other device the arched frame 13 is grasped by the hand, together with the bail 17. By pressing the bail 17 downward, as shown in Fig. I, the slats 2 will be thrown into a vertical position, as shown in Fig. I, and the eggs will be discharged into their respective positions in the crate end downward. As the openings in the slats are open on each side, when the slats are changed from a horizontal to a vertical position there will be no interference or resistance to the passage of the eggs into the crate, the same dropping instantly in the same position in which they are placed in the openings 5. After the eggs have been discharged the bail 17 is released by the hand and the spring 12 will force the bar 10 back to its normal position, (see Fig. III,) thus returning the slats back to their horizontal position ready to receive another supply of eggs in order to be tested. It will be observed that the outer slats 2 are made in half-sections, as shown in Fig. V, in order to form the thirty-six holes, or the same number of holes in a filler for crates, without any extension on the opposite sides.

21 represents a tester having cleats 22 secured thereto for holding the tray 1 and having a removable bottom 23, secured by buttons 24, (see Fig. I,) whereby said bottom can be removed at will in order to clean the tester;

or, if it is desired to use the looking-glass 25, whereby the eggs are tested, the same can be done by turning the buttons and removing the bottom.

26 represents a tray, which may be placed over the glass 25 in order to catch any dirt; or if, perchance, a small egg should slip through the openings 5 it will fall on the tray 26, the body of the same being preferably formed of canvas and preventing the egg from striking on the glass. Of course while the eggs are being tested the tray 26 is removed, in order to let the light shine through the eggs onto the glass 25.

By the use of my device I am enabled to deposit or remove three dozen eggs from the tester to the shipping-crate as readily and as quickly as I could one egg if I had to take them up by hand and deposit them in the crate and with a less chance of breaking the same in thus transferring them.

My tester can be used by either natural or artificial light, the light coming from outside of the tester.

I claim as my invention—

1. The combination of the frame 1, slats 2, pivoted thereto and having openings therein for the reception of eggs, arched frame 13, having slots 14, a bar 10, having its ends working in said slots, rods 8 for connecting the bar 10 with the slats 2, and means for raising and lowering said bar in order to change the position of the slats, substantially as and for the purpose set forth.

2. The combination of the frame 1, slats 2, pivoted thereto, having suitable openings for holding eggs, arched frame 13, having slots 14, bar 10, having its ends working in said slots, rods 8, connecting the bar 10 with the slats 2, brace-rod 20, a spring 12, connecting the bar 10 with the frame 13, and a bail 17, in connection with the bar 10 and extending up through the arched frame 13, substantially as and for the purpose set forth.

JEREMIAH B. GARLAND.

Witnesses:
L. S. SPRAGUE,
JAS. A. DRAKE.